US011855560B2

(12) United States Patent
Lin et al.

(10) Patent No.: US 11,855,560 B2
(45) Date of Patent: Dec. 26, 2023

(54) MOTOR CONTROL DEVICE AND MOTOR CONTROL METHOD

(71) Applicant: DELTA ELECTRONICS, INC., Taoyuan (TW)

(72) Inventors: Yu-Shian Lin, Taoyuan (TW); Ming-Tsung Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 28 days.

(21) Appl. No.: 17/446,159

(22) Filed: Aug. 26, 2021

(65) Prior Publication Data

US 2022/0329189 A1    Oct. 13, 2022

(30) Foreign Application Priority Data

Apr. 8, 2021    (CN) .......................... 202110377332.1

(51) Int. Cl.

| H02P 6/16 | (2016.01) |
|---|---|
| H02P 21/06 | (2016.01) |
| H02P 23/14 | (2006.01) |
| H02M 5/27 | (2006.01) |
| H02P 27/04 | (2016.01) |

(52) U.S. Cl.
CPC ............ *H02P 23/14* (2013.01); *H02M 5/271* (2013.01); *H02P 27/047* (2013.01)

(58) Field of Classification Search
CPC ............. H02P 6/10; H02P 23/14; H02P 21/14
See application file for complete search history.

(56) References Cited

U.S. PATENT DOCUMENTS

| 5,281,903 A | 1/1994 | Oku et al. |
|---|---|---|
| 5,350,989 A | 9/1994 | Wedeen |
| 9,287,812 B2 | 3/2016 | Nondahl et al. |
| 9,490,738 B2 | 11/2016 | Nondahl et al. |

(Continued)

FOREIGN PATENT DOCUMENTS

| CN | 104253572 B | 4/2017 |
|---|---|---|
| CN | 105811849 B | 3/2018 |

(Continued)

*Primary Examiner* — Kawing Chan
*Assistant Examiner* — Charles S Laughlin
(74) *Attorney, Agent, or Firm* — CKC & Partners Co., LLC (57) ABSTRACT

A motor control method includes the following steps: receiving a frequency command and an excitation current setting value as a motor speed command; running a magnetic flux calculation program to generate a magnetic flux voltage command; generating a synchronous coordinate voltage command, and providing a three-phase current to a sensorless motor; calculating a synchronous coordinate feedback current based on the three-phase current, and calculating an effective current value of three-phase current; calculating a reactive power feedback value based on synchronous coordinate voltage command and the synchronous coordinate feedback current; running a steady state calculation program to calculate a reactive power command based on frequency command and the effective current value; calculating a reactive power error value between the reactive power command and the reactive power feedback value; and adding magnetic flux voltage command and reactive power error value to adjust synchronous coordinate voltage command and change three-phase current.

12 Claims, 7 Drawing Sheets

(56) References Cited

U.S. PATENT DOCUMENTS

| | | | |
|---|---|---|---|
| 10,135,378 B2 | 11/2018 | Lee et al. | |
| 2003/0071588 A1* | 4/2003 | Iwaji | H02P 6/12 |
| | | | 318/400.01 |
| 2020/0186070 A1 | 6/2020 | Kojima et al. | |
| 2020/0373864 A1 | 11/2020 | Kojima et al. | |
| 2021/0058017 A1 | 2/2021 | Hachiya | |
| 2022/0094291 A1* | 3/2022 | Tobari | H02P 27/047 |

FOREIGN PATENT DOCUMENTS

| | | |
|---|---|---|
| CN | 104467597 B | 8/2018 |
| TW | 200306059 A | 11/2003 |
| TW | I315602 B | 10/2009 |
| TW | I535185 B | 5/2016 |
| TW | I654827 B | 3/2019 |

* cited by examiner

MOTOR CONTROL DEVICE AND MOTOR CONTROL METHOD

CROSS-REFERENCE TO RELATED APPLICATION

This application claims priority to China Application Serial Number 202110377332.1, filed Apr. 8, 2021, which is herein incorporated by reference in its entirety.

BACKGROUND

Technical Field

The present disclosure relates to a motor control device and a motor control method for driving a rotation of a motor without a sensor.

Description of Related Art

As the energy policies of various countries around the world change, the requirements for the operating efficiency of motors are also increasing. A synchronous reluctance motor (SynRM) has critical advantages, such as high operating efficiency, low manufacturing cost, robust mechanical structure, etc., and also has the advantages of a permanent magnet motor and an induction motor. Therefore, in order to meet the requirements of energy policies, the research of synchronous reluctance motors has received more and more attention.

At present, in consideration of the control of synchronous reluctance motors, most of them need to be equipped with a position sensor or an encoder to facilitate motor control. However, the use of the position sensor or encoder usually significantly increases the manufacturing cost. In addition, in a miniaturized motor product, it is not easy to accommodate the position sensor or encoder within a limited space.

In addition to that, much research on motors without position sensors require estimators, such as flux observers and position and speed estimators, to perform algorithmic computations so as to obtain information, including motor position, speed, and the like. However, an estimator needs a large number of correct motor parameters to establish a motor model before the information, including motor position, speed, and the like, can be accurately calculated.

For the foregoing reasons, there is a need to solve the above-mentioned problems by providing a motor control device and a motor control method.

SUMMARY

A motor control method for a motor without a sensor is provided. The motor control method comprises the following steps: receiving a frequency command and an excitation current setting value as a motor speed command; running a magnetic flux calculation program to generate a magnetic flux voltage command according to the motor speed command; converting the magnetic flux voltage command into a synchronous coordinate voltage command, and generating a three-phase current to the motor; calculating a synchronous coordinate feedback current based on the three-phase current, and calculating an effective current value of the three-phase current; calculating a reactive power feedback value based on the synchronous coordinate voltage command and the synchronous coordinate feedback current; running a steady state calculation program to calculate a reactive power command based on the frequency command and the effective current value; calculating a reactive power error value between the reactive power command and the reactive power feedback value; and adding the magnetic flux voltage command and the reactive power error value to adjust the synchronous coordinate voltage command and change the three-phase current.

The present disclosure provides a motor control method for a motor without a sensor. The motor control method comprises the following steps: receiving a frequency command and an excitation current setting value as a motor speed command; running a magnetic flux calculation program to generate a magnetic flux voltage command according to the motor speed command; converting the magnetic flux voltage command into a synchronous coordinate voltage command, and generating a three-phase current to the motor without the sensor; calculating a synchronous coordinate feedback current based on the three-phase current, and calculating an effective current value of the three-phase current; calculating an active power feedback value based on the synchronous coordinate voltage command and the synchronous coordinate feedback current; calculating an air-gap power change based on the active power feedback value and the effective current value; and adjusting the synchronous coordinate voltage command and changing the three-phase current to the motor without the sensor based on the air-gap power change.

The present disclosure further provides a motor control device for a motor without a sensor. The motor control device comprises a magnetic flux arithmetic unit, a drive arithmetic unit, a feedback arithmetic unit, and a compensation arithmetic unit. The magnetic flux arithmetic unit is configured to receive a frequency command and an excitation current setting value to calculate a magnetic flux voltage command. The drive arithmetic unit is configured to convert the magnetic flux voltage command into a synchronous coordinate voltage command, and generate a three-phase current to the motor. The feedback arithmetic unit is configured to calculate a synchronous coordinate feedback current based on the three-phase current, and obtain an effective current value of the three-phase current. The feedback arithmetic unit calculates a reactive power feedback value based on the synchronous coordinate voltage command and the synchronous coordinate feedback current. The compensation arithmetic unit is configured to calculate a reactive power command based on the frequency command and the effective current value. The compensation arithmetic unit is configured to calculate a reactive power error value between the reactive power command and the reactive power feedback value. The drive arithmetic unit is further configured to add the magnetic flux voltage command and the reactive power error value to adjust the synchronous coordinate voltage command and change the three-phase current.

The present disclosure mainly provides the driving technology of a synchronous reluctance motor without a position sensor. According to the present disclosure, only basic motor parameters are used, non-linear parameters need not be considered, and the compensation method that improves efficiency and stability is used. As a result, the present disclosure can achieve the operation performances of high efficiency and good stability, and has the advantages of a low amount of motor parameters and simpler calculation method as compared with the conventional method.

It is to be understood that both the foregoing general description and the following detailed description are by examples, and are intended to provide further explanation of the present disclosure as claimed.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and elements are schematically depicted in order to simplify the drawings. It is noted that a motor without a sensor hereinafter called usually refers to a motor without a position sensor (for example: an encoder)

Figure 1A:
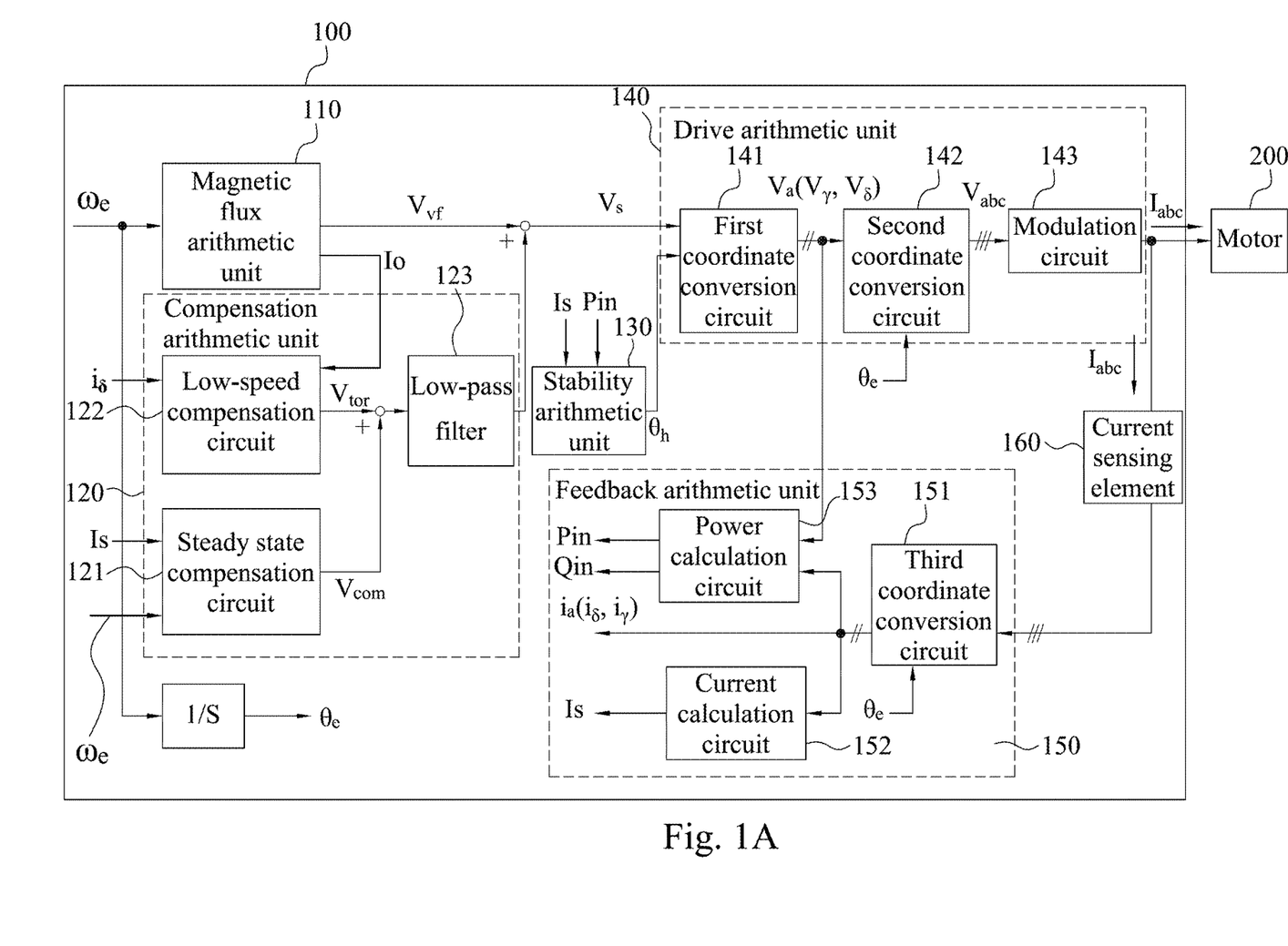
FIG. 1A depicts a schematic diagram of a motor control device according to some embodiments of the present disclosure.

A description is provided with reference to FIG. 1A, FIG. 1B, FIG. 1C, FIG. 1D, FIG. 1E, FIG. 2A and FIG. 2B to illustrate the following various embodiments. As shown in FIG. 1A, a motor control device 100 comprises a magnetic flux arithmetic unit 110, a compensation arithmetic unit 120, a stability arithmetic unit 130, a drive arithmetic unit 140, a feedback arithmetic unit 150, and a current sensing element 160. The motor control device 100 is configured to drive a motor 200 without a sensor. The motor 200 may be a synchronous reluctance motor, but the present disclosure is not limited in this regard.

Figure 2A:
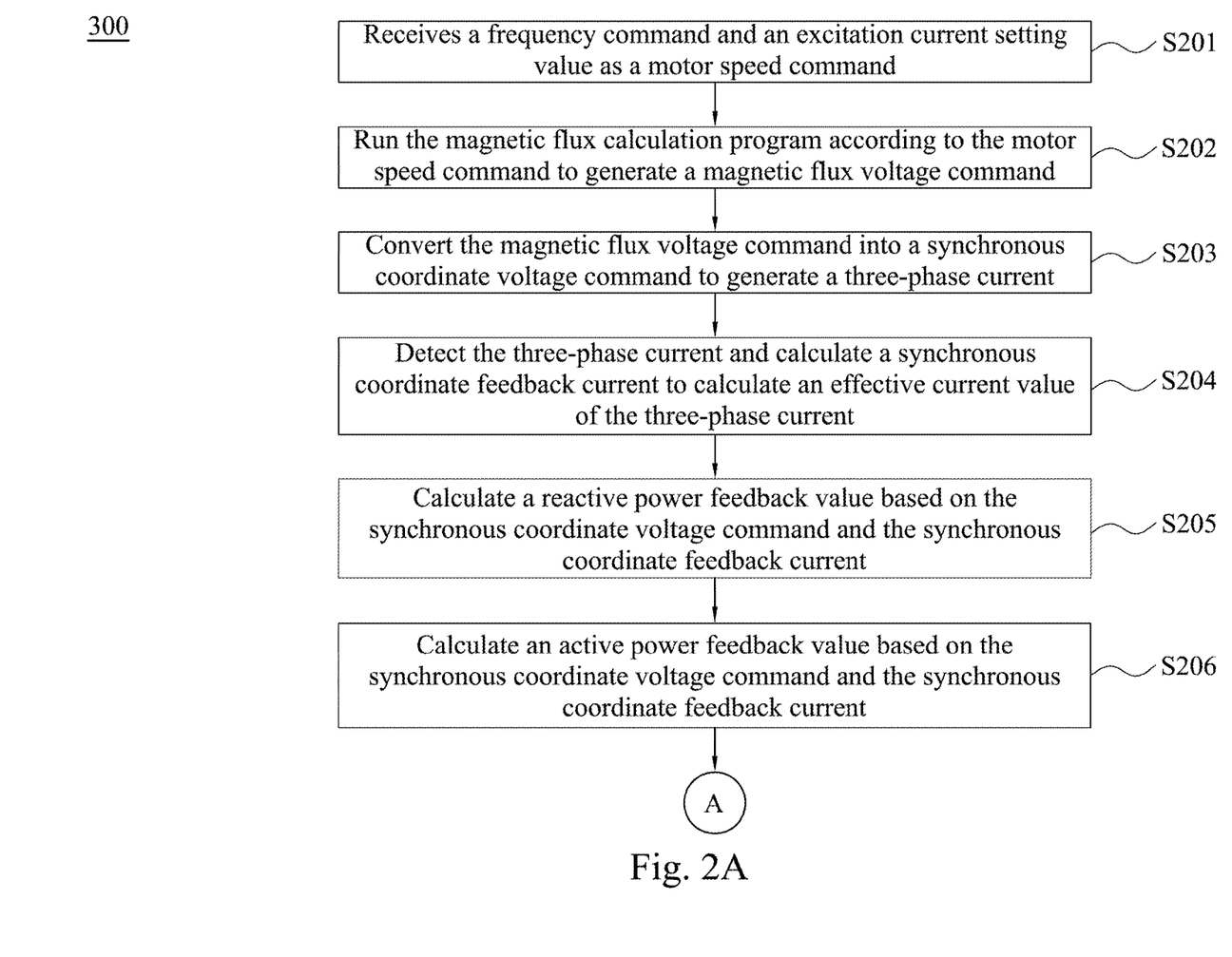
FIG. 2A and FIG. 2B depict flowcharts of a motor control method according to some embodiments of the present disclosure.
Figure 2B:
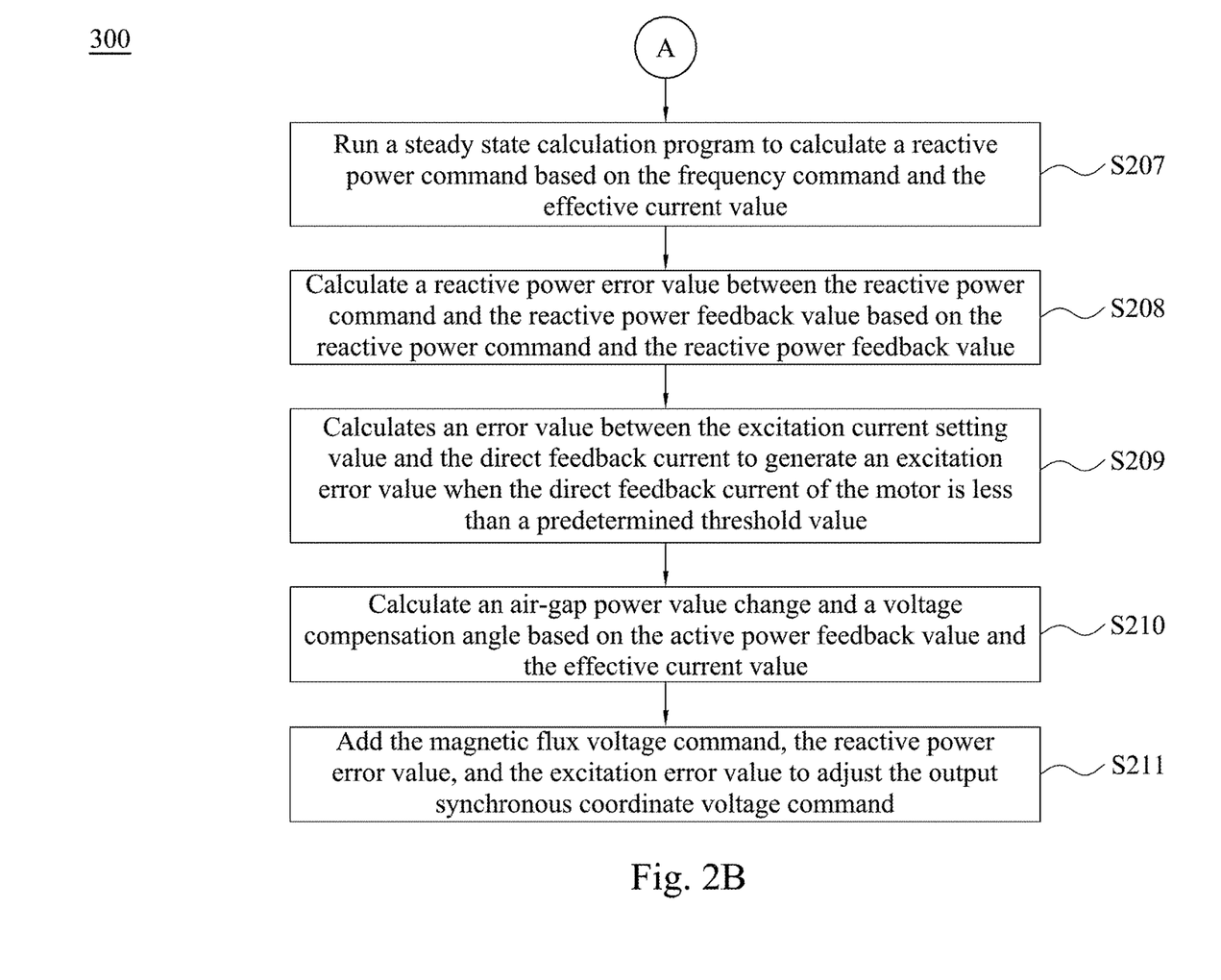

As shown in FIG. 2A and FIG. 2B, the present disclosure provides a motor control method 300, and the motor control method 300 is adapted for the motor 200 without the sensor. The motor control method 300 comprises steps S201 to S211, and the motor control method 300 is performed by the motor control device 100 (as shown in FIG. 1A).

Figure 1B:
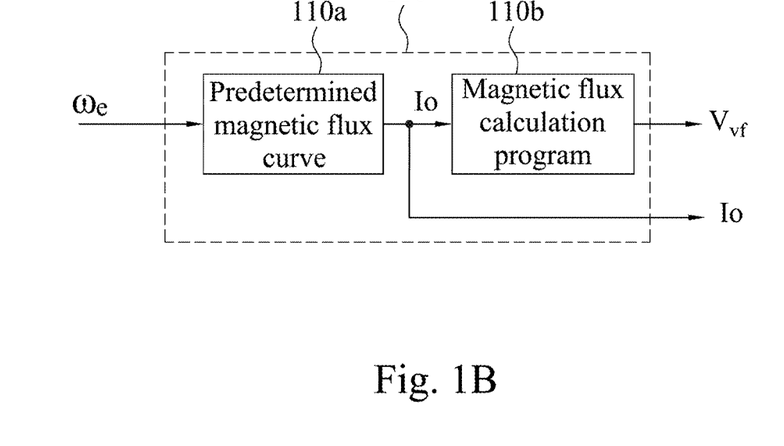
FIG. 1B depicts a schematic diagram of a magnetic flux arithmetic unit according to some embodiments of the present disclosure.

As shown in FIG. 1A, FIG. 1B, and FIG. 2A, in step S201, the magnetic flux arithmetic unit 110 of the motor control device 100 receives a frequency command $\omega_e$ and an excitation current setting value Io as a motor speed command. In some embodiments, the magnetic flux arithmetic unit 110 comprises a predetermined magnetic flux curve 110a and a magnetic flux calculation program 110b, as shown in FIG. 1B. The predetermined magnetic flux curve 110a is a curve obtained based on a ratio of the excitation current setting value Io to the frequency command $\omega_e$ (for example: Io/$\omega_e$), and is used for recording characteristics of the motor 200. Through the predetermined magnetic flux curve 110a, the magnetic flux arithmetic unit 110 can only receive the frequency command $\omega_e$ to obtain the excitation current setting value Io or only receive the excitation current setting value Io to obtain the frequency command $\omega_e$. Or, under the circumstances that the predetermined magnetic flux curve 110a is not disposed, the magnetic flux arithmetic unit 110 simultaneously receives the excitation current setting value Io and the frequency command $\omega_e$. In addition, the frequency command $\omega_e$ can generate a drive angle $\theta_e$ through a 1/S operator. The 1/S operator is a Laplace transform or a Fourier transform commonly used by those skilled in the art. Since those skilled in the art can understand its meaning and operation method and the present disclosure is not limited in this regard, a description is not provided here.

As shown in FIG. 1A, FIG. 1B, and FIG. 2A, in step S202, the magnetic flux arithmetic unit 110 runs the magnetic flux calculation program 110b according to the motor speed command (including the excitation current setting value Io and the frequency command $\omega_e$) to generate a magnetic flux voltage command $V_{vf}$. A description is provided with reference to FIG. 1A, FIG. 1B and FIG. 3 for the illustration of the operating principle of the magnetic flux calculation program 110b.

Figure 3:
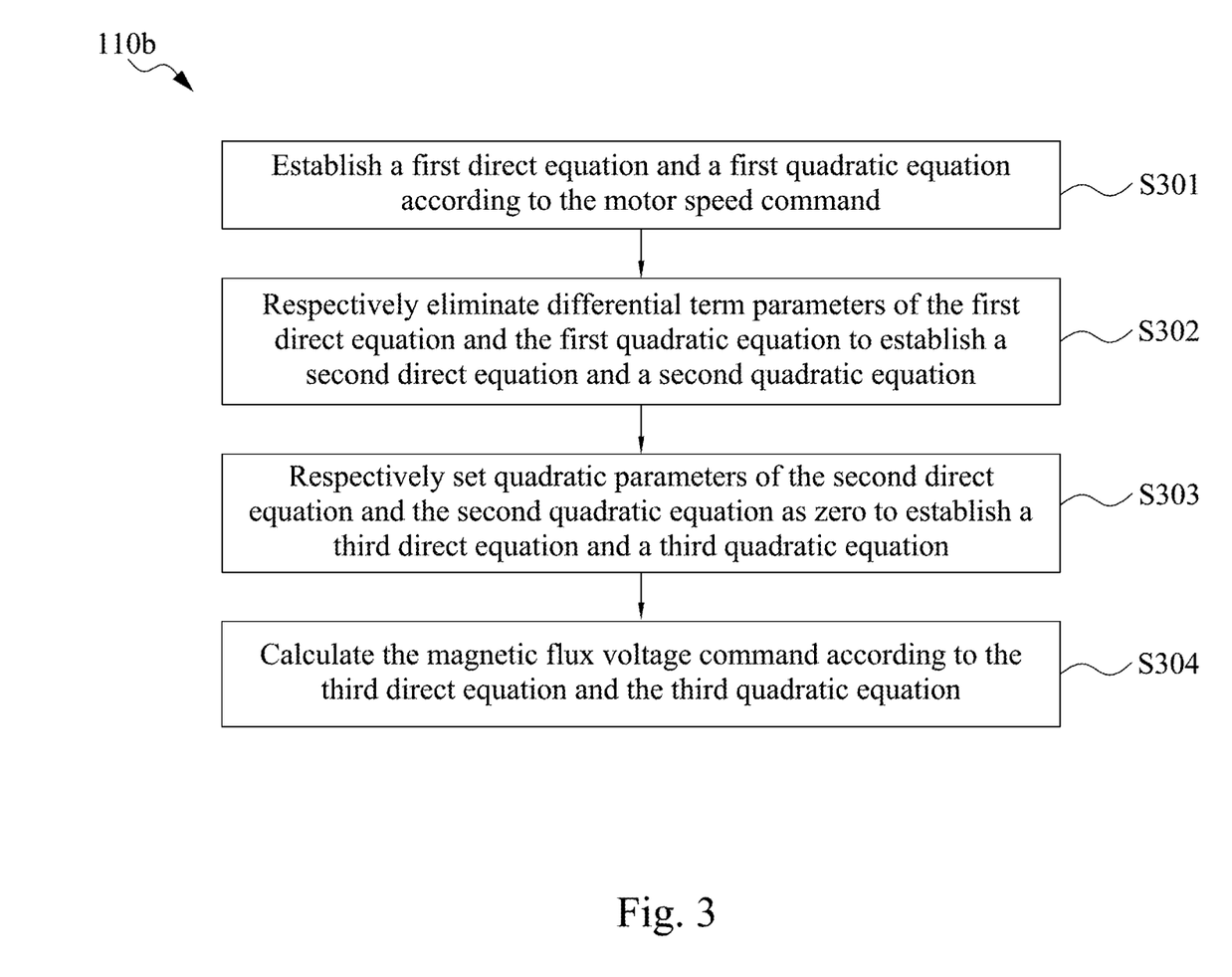
FIG. 3 depicts a flowchart of a magnetic flux calculation program according to some embodiments of the present disclosure.

The magnetic flux calculation program 110b comprises steps S301 to S304. In step S301, the magnetic flux arithmetic unit 110 establishes a first direct equation and a first quadratic equation according to the motor speed command. The first direct equation is shown as equation (1), and the first quadratic equation is shown as equation (2).

$$v_d = R_s i_d + L_d p i_d - \omega_\gamma L_q i_q \quad (1)$$

$$v_q = R_s i_q + L_q p i_q + \omega_\gamma L_d i_d \quad (2)$$

Where $V_d$ is a direct voltage of a motor stator, $v_q$ is a quadratic voltage of the motor stator, $R_s$ is a resistance of the motor stator, $L_d$ is a direct self-inductance of a motor, $L_q$ is a quadratic self-inductance of the motor, $i_d$ is a direct current of the motor stator, $i_q$ is a quadratic current of the motor stator, $\omega_\gamma$ is a rotation speed of a motor rotor, and p is a differential term factor. It is noted that equations (1) and (2) represent two-axis voltage equations of the motor 200. $R_s$, $L_d$, and $L_q$ in equations (1) and (2) are linear parameters of the motor, and these linear parameters are preset in a program of the motor control device 100 (or the magnetic flux arithmetic unit 110). Additionally, $i_d$ and $i_q$ come from the excitation current setting value Io, and $\omega_\gamma$ comes from the frequency command $\omega_e$.

In step S302, the magnetic flux arithmetic unit 110 respectively eliminates differential term parameters of the first direct equation and the first quadratic equation (such as: $L_d p i_d$, $L_q p i_q$) to establish a second direct equation (as shown in equation (3)) and a second quadratic equation (as shown in equation (4)).

$$v_d = R_s i_d - \omega_\beta L_q i_q \quad (3)$$

$$v_q = R_s i_q + \omega_\gamma L_d i_d \quad (4)$$

The purpose of eliminating the differential term parameters of the first direct equation and the first quadratic equation is to assume that the motor 200 maintains a steady state (that is, the rotation speed of the motor 200 remains unchanged). Hence, equation (3) is also regarded as a direct steady state equation, and equation (4) is also regarded as a quadratic steady state equation. At this time, $i_d$ can also be regarded as a steady state value of the direct current, and $i_q$ can also be regarded as a steady state value of the quadratic current.

In step S303, the magnetic flux arithmetic unit 110 respectively sets quadratic parameters of the second direct equation and the second quadratic equation (such as: $i_q$) as zero to establish a third direct equation (as shown in equation (5)) and a third quadratic equation (as shown in equation (6)).

$$v_d = R_s i_d \qquad (5)$$

$$v_q = \omega_r L_d i_d \qquad (6)$$

The purpose of setting the quadratic parameters of the second direct equation and the second quadratic equation as zero is to assume that the motor 200 is not connected to any load (that is, no load). It is noted that in order to improve control efficiency of the motor 200, it is necessary to assume that the motor 200 maintains an ideal state when calculating the magnetic flux voltage command $V_{vf}$, and the ideal state is that the motor 200 maintains the steady state and has no load.

In step S304, the magnetic flux arithmetic unit 110 calculates the magnetic flux voltage command $V_{vf}$ according to the third direct equation and the third quadratic equation. The calculation method of the magnetic flux voltage command $V_{vf}$ is shown in equation (7):

$$V_{vf} = \sqrt{\frac{3}{2}} \sqrt{(v_d)^2 + (v_q)^2} = \sqrt{\frac{3}{2}} \sqrt{(R_g i_d)^2 + (\omega_r L_d i_d)^2} \qquad (7)$$

As shown in FIG. 1A and FIG. 2A, in step S203, the drive arithmetic unit 140 receives the magnetic flux voltage command $V_{vf}$ as a driving voltage signal $V_s$, and the drive arithmetic unit 140 comprises a first coordinate conversion circuit 141, a second coordinate conversion circuit 142, and a modulation circuit 143. The first coordinate conversion circuit 141 converts the magnetic flux voltage command $V_{vf}$ into a synchronous coordinate voltage command $V_a$ based on a voltage compensation angle $\theta_h$. The second coordinate conversion circuit 142 generates a three-phase voltage $V_{abc}$ based on the drive angle $\theta_e$ and the synchronous coordinate voltage command $V_a$, and the modulation circuit 143 switches the three-phase voltage $V_{abc}$ to generate a three-phase current $I_{abc}$ to the motor 200. The method of generating the voltage compensation angle $\theta_h$ is described in the following paragraphs. The synchronous coordinate voltage command $V_a$ comprises a direct voltage command $V_\delta$ and quadratic voltage command $V_\gamma$. It is noted that when the motor control device 100 operates for the first time, the magnetic flux voltage command $V_{vf}$ is equal to the driving voltage signal $V_s$ because not any feedback signal is generated. In addition to that, since the operating principle of the drive arithmetic unit 140 belongs to the conventional technology in the field, a description in this regard is not provided. Then, the motor control device 100 further comprises a current sensing element 160, and the current sensing element 160 is configured to detect the three-phase current $I_{abc}$ and transmit a measured value of the three-phase current $I_{abc}$ to the feedback arithmetic unit 150. In some other embodiments, the current sensing element 160 detects currents of any two phases of the three-phase current $I_{abc}$ and transmits them to the feedback arithmetic unit 150. The feedback arithmetic unit 150 calculates an unmeasured third-phase current based on the received currents of the any two phases.

As shown in FIG. 1A and FIG. 2A, in step S204, a third coordinate conversion circuit 151 of the feedback arithmetic unit 150 calculates a synchronous coordinate feedback current $I_a$ based on the measured value of the three-phase current $I_{abc}$ and the drive angle $\theta_e$, and the synchronous coordinate feedback current $I_a$ comprises a direct feedback current $i_\delta$ and a quadratic feedback current $i_\gamma$. Then, a current calculation circuit 152 of the feedback arithmetic unit 150 uses an equation (8) to calculate an effective current value Is of the three-phase current $I_{abc}$ based on the direct feedback current $i_\delta$ and the quadratic feedback current $i_\gamma$. The equation (8) is shown as follows:

$$Is = \frac{\sqrt{(i_\delta)^2 + (i_\gamma)^2}}{2} \qquad (8)$$

As shown in FIG. 1A and FIG. 2A, in step S205, a power calculation circuit 153 of the feedback arithmetic unit 150 calculates a reactive power feedback value Qin based on the synchronous coordinate voltage command $V_a$ (including the direct voltage command $V_\delta$ and the quadratic voltage command $V_\gamma$) and the synchronous coordinate feedback current $i_a$ (including the direct feedback current $i_\delta$ and the quadratic feedback current $i_\gamma$). The power calculation circuit 153 comprises an equation (9), and calculates the reactive power feedback value Qin according to the equation (9). The equation (9) is shown as follows:

$$Qin = 1.5(V_\gamma i_\delta - V_\delta i_\gamma) \qquad (9)$$

As shown in FIG. 1A and FIG. 2A, in step S206, the power calculation circuit 153 of the feedback arithmetic unit 150 calculates an active power feedback value Pin based on the synchronous coordinate voltage command $V_a$ (including the direct voltage command $V_\delta$ and the quadratic voltage command $V_\gamma$) and the synchronous coordinate feedback current $i_a$ (including the direct feedback current $i_\delta$ and the quadratic feedback current $i_\gamma$). The power calculation circuit 153 comprises an equation (10), and calculates the active power feedback value Pin according to the equation (10). The equation (10) is shown as follows:

$$Pin = 1.5(V_\delta i_\delta + V_\gamma i_\gamma) \qquad (10)$$

Figure 1C:
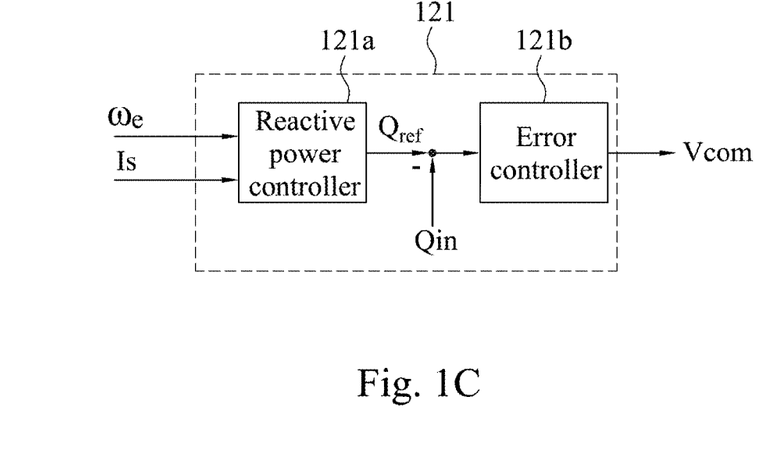
FIG. 1C depicts a schematic diagram of a steady state compensation circuit according to some embodiments of the present disclosure.

As shown in FIG. 1A, FIG. 1C and FIG. 2B, in step S207, a steady state compensation circuit 121 of the compensation arithmetic unit 120 runs a steady state calculation program to calculate a reactive power command Qref based on the frequency command $\omega_e$ and the effective current value Is. The steady state compensation circuit 121 comprises a reactive power controller 121a and an error controller 121b, and the reactive power controller 121a is configured to run the steady state calculation program. A description is provided with reference to FIG. 1C, FIG. 2A and FIG. 4 for the illustration of the operating principle of the steady state calculation program 500.

Figure 4:
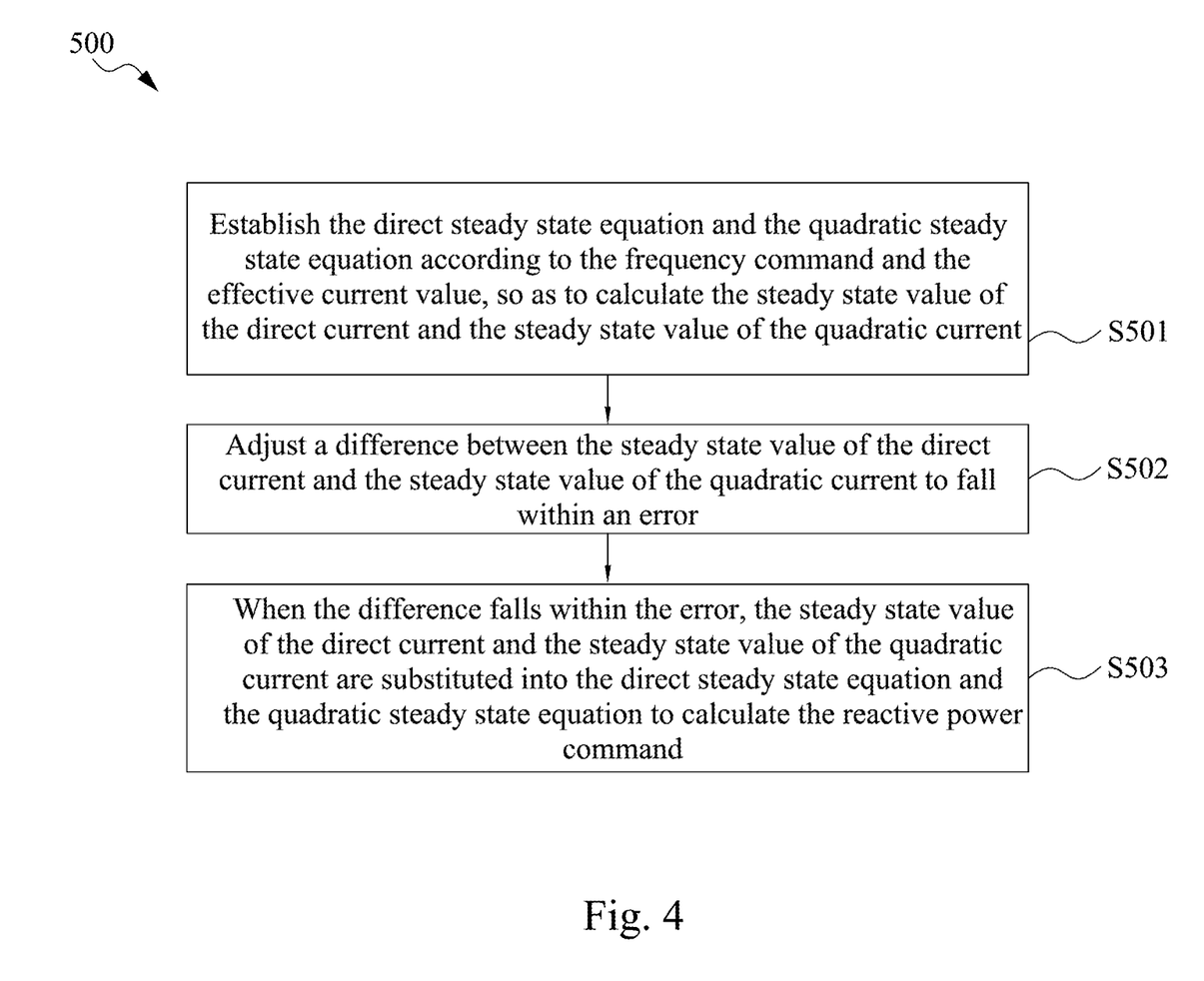
FIG. 4 depicts a flowchart of a steady state calculation program according to some embodiments of the present disclosure.

The steady state calculation program 500 comprises steps S501 to S503. In step S501, the reactive power controller 121a establishes the direct steady state equation (as shown in equation (3)) and the quadratic steady state equation (as shown in equation (4)) according to the frequency command $\omega_e$ and the effective current value Is, so as to calculate the steady state value of the direct current $i_d$ and the steady state value of the quadratic current $i_q$.

In step S502, the reactive power controller 121a adjusts a difference between the steady state value of the direct current $i_d$ and the steady state value of the quadratic current $i_q$ to fall within an error (ideal condition: the steady state value of the direct current $i_d$ is equal to the steady state value of the quadratic current $i_q$).

In step S503, when the reactive power controller 121a determines that the difference falls within the error, the steady state value of the direct current $i_d$ and the steady state value of the quadratic current $i_q$ are substituted into the direct steady state equation (equation (3)) and the quadratic steady state equation (equation (4)) to calculate the reactive power command Qref. The calculation method of the reactive power command Qref is shown in equation (11) and equation (12):

$$Qref=1.5((R_s i_d + \omega_e L_d i_d)i_d - (R_s i_d - \omega_e L_q i_q)i_q) \quad (11)$$

After arranging equation (8) and equation (11), an equation (12) can be obtained:

$$Qref=1.5\omega_e Is^2 (L_d + L_q) \quad (12)$$

As shown in FIG. 1A, FIG. 1C and FIG. 2B, in step S208, the steady state compensation circuit 121 of the compensation arithmetic unit 120 calculates an error value between the reactive power command Qref and the reactive power feedback value Qin, and the error value, being used as a reactive power error value $V_{com}$, is output to a low-pass filter 123 through the error controller 121b to filter out noises. In some embodiments, the motor control device 100 directly adds the magnetic flux voltage command $V_{vf}$ and the reactive power error value $V_{com}$ to serve as the driving voltage signal $V_s$, and adjusts the synchronous coordinate voltage command $V_a$ (including the direct voltage command $V_\delta$ and the quadratic voltage command $V_\gamma$) through the drive arithmetic unit 140 to further change the three-phase current $I_{abc}$ so as to drive the motor 200.

Figure 1D:
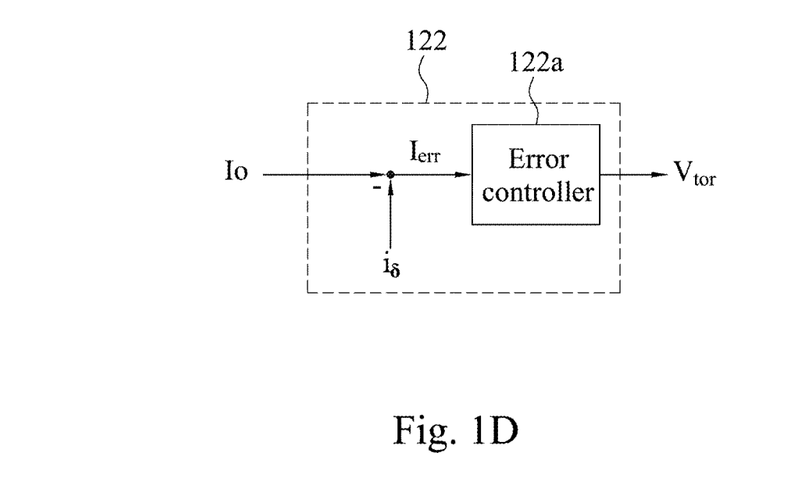
FIG. 1D depicts a schematic diagram of a low-speed compensation circuit according to some embodiments of the present disclosure.

As shown in FIG. 1A, FIG. 1D and FIG. 2B, in step S209, when a low-speed compensation circuit 122 of the compensation arithmetic unit 120 determines that the direct feedback current $i_\delta$ of the motor 200 is less than a predetermined threshold value (it indicates that the motor 200 is operating at a low speed), the low-speed compensation circuit 122 calculates an error value $i_{err}$ between the excitation current setting value Io and the direct feedback current $i_\delta$ of the synchronous coordinate feedback current $i_a$, and generates an excitation error value $V_{tor}$ through an error controller 122a. When the motor 200 operates at the low speed, a driving performance of the motor 200 is significantly reduced. Therefore, the excitation error value $V_{tor}$ calculated through the low-speed compensation circuit 122 is used as compensation, which can effectively increase the driving performance of the motor 200 that maintains at the low speed. In some embodiments, a signal generated by adding the excitation error value $V_{tor}$ and the reactive power error value $V_{com}$ is filtered through the low-pass filter 123 to filter out noises. The excitation error value $V_{tor}$ is used to be added to the magnetic flux voltage command $V_{vf}$ and the reactive power error value $V_{com}$ to adjust the synchronous coordinate voltage command $V_a$.

Figure 1E:
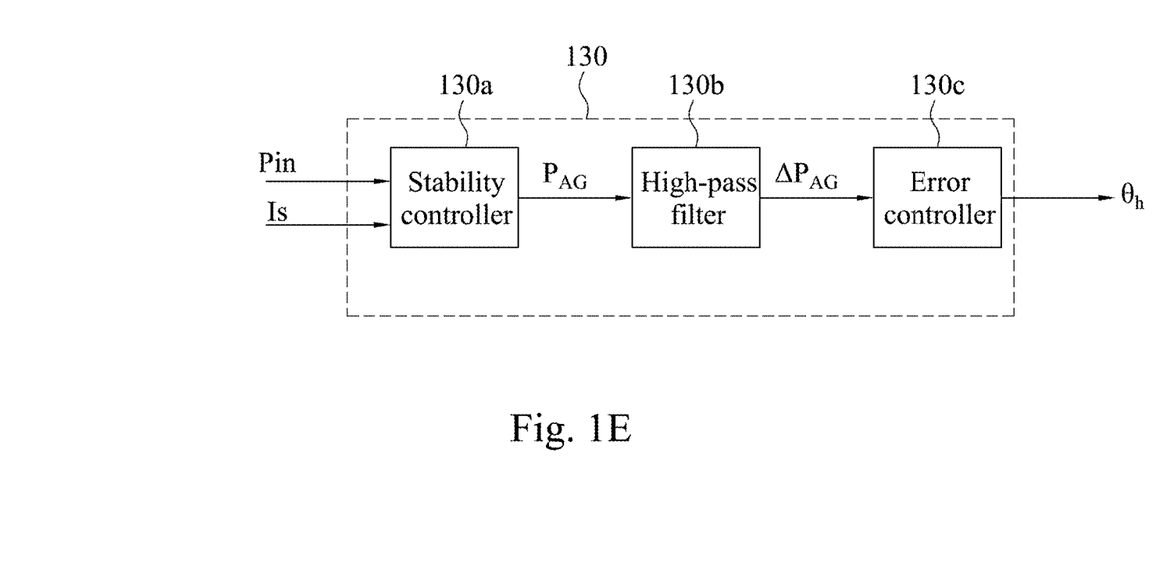
FIG. 1E depicts a schematic diagram of a stability arithmetic unit according to some embodiments of the present disclosure.

As shown in FIG. 1A, FIG. 1E and FIG. 2B, in step S210, a stability controller 130a of the stability arithmetic unit 130 calculates an air-gap power value $P_{AG}$ based on the active power feedback value Pin and the effective current value Is. The air-gap power value $P_{AG}$ represents power transmitted to the rotor of the motor from an air gap between the stator and the rotor. The stability controller 130a comprises an equation (13) to calculate the air-gap power value PAG. The equation (13) is shown as follows:

$$P_{AG}=Pin-3Is^2 R_s \quad (13)$$

Then, a high-pass filter 130b of the stability arithmetic unit 130 calculates an air-gap power change $\Delta P_{AG}$ based on the real-time air-gap power value $P_{AG}$. The air-gap power change $\Delta P_{AG}$ indicates an oscillation condition of the motor 200, or an oscillation condition of a load (not shown in the figure) connected to the motor 200. After that, an error controller 130c of the stability arithmetic unit 130 generates a voltage compensation angle $\theta_h$ based on the air-gap power change $\Delta P_{AG}$. The calculation method of the voltage compensation angle $\theta_h$ is shown in equation (14):

$$\Theta_h = -K_p \cdot \Delta P_{AG} \quad (14)$$

In equation (14), the voltage compensation angle $\theta_h$ can be regarded as the oscillation condition of the motor 200, $-K_p$ is a negative proportional constant, and $-K_p$ is a proportional constant in inverse proportion to an output frequency. That is to say, the voltage compensation angle $\theta_h$ represents an amount of compensation, which in turn causes that the motor 200 needs to generate a reaction torque to overcome the oscillation condition of the motor 200. Therefore, in order to reduce the above-mentioned oscillation of the motor 200, the stability arithmetic unit 130 provides the voltage compensation angle $\theta_h$ to the drive arithmetic unit 140 based on the air-gap power change $\Delta P_{AG}$. As a result, the drive arithmetic unit 140 adjusts the synchronous coordinate voltage command $V_a$, to further change the three-phase current $I_{abc}$, thus allowing the motor 200 to generate the reaction torque.

As shown in FIG. 1A and FIG. 2B, in step S211, when the motor 200 operates at the low speed, the motor control device 100 mainly adds the excitation error value $V_{tor}$, the magnetic flux voltage command $V_{vf}$ and the reactive power error value $V_{com}$ to be the driving voltage signal $V_s$, so that the drive arithmetic unit 140 adjusts the synchronous coordinate voltage command $V_a$, and further changes the three-phase current $I_{abc}$. When the motor 200 does not operate at the low speed, the motor control device 100 mainly adds the magnetic flux voltage command $V_{vf}$ and the reactive power error value $V_{com}$ to be the driving voltage signal $V_s$, so that the drive arithmetic unit 140 adjusts the synchronous coordinate voltage command $V_a$, and further changes the three-phase current $I_{abc}$.

In the above steps S201 to S211, various compensations are performed for different conditions of the motor 200. However, the present disclosure is not limited in this regard. In one embodiment, if the probability of low-speed torque appearing in the motor 200 is not high, the motor control device 100 can adjust the synchronous coordinate voltage command $V_a$ only according to the magnetic flux voltage command $V_{vf}$ and the reactive power error value $V_{com}$. Similarly, depending on different control requirements, the motor control device 100 can also adjust the synchronous coordinate voltage command $V_a$ only according to the air-gap power change $\Delta P_{AG}$ to change the three-phase current $I_{abc}$. In other words, the motor control device 100 can selectively compensate for one or more conditions (that is, no-load condition, loaded condition, low-speed torque condition, or air-gap power change) based on the driving situation.

According to the present disclosure, the motor 200 is first driven through steps S201 to S203. Then, through steps S204 to S206, data including the synchronous coordinate feedback current $i_a$ (the direct feedback current $i_δ$ and the quadratic feedback current $i_γ$), the effective current value Is, the reactive power feedback value Qin, and the active power feedback value Pin are calculated based on the feedbacked three-phase current $I_{abc}$. Finally, through steps S207 to S211, the reactive power error value $V_{com}$, the excitation error value $V_{tor}$, and the air-gap power change (that is, the corresponding voltage compensation angle $θ_h$) are generated to compensate for the possible errors of the motor 200 under different conditions.

The "circuit" and "controller" mentioned in the present disclosure may be digital logic circuits, hardware circuits or other programming languages, but the present disclosure is not limited in this regard.

The various elements, method steps, or technical features in the foregoing embodiments can be combined with one another, and are not limited to the order of the text description or the order of the drawings in the present disclosure.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the invention. In view of the foregoing, it is intended that the present disclosure cover modifications and variations of this present disclosure provided they fall within the scope of the following claims and their equivalents.

What is claimed is:

1. A motor control method for a motor without a sensor comprising:
   receiving a frequency command and an excitation current setting value as a motor speed command;
   running a magnetic flux calculation program to generate a magnetic flux voltage command according to the motor speed command;
   converting the magnetic flux voltage command into a synchronous coordinate voltage command, and generating a three-phase current to the motor;
   calculating a synchronous coordinate feedback current based on the three-phase current, and calculating an effective current value of the three-phase current;
   calculating a reactive power feedback value based on the synchronous coordinate voltage command and the synchronous coordinate feedback current;
   running a steady state calculation program to calculate a reactive power command based on the frequency command and the effective current value;
   calculating a reactive power error value between the reactive power command and the reactive power feedback value; and
   adding the magnetic flux voltage command and the reactive power error value to adjust the synchronous coordinate voltage command and change the three-phase current,
   wherein the magnetic flux calculation program comprises:
      establishing a first direct equation and a first quadratic equation according to the motor speed command;
      respectively eliminating differential term parameters of the first direct equation and the first quadratic equation to establish a second direct equation and a second quadratic equation;
      respectively setting quadratic parameters of the second direct equation and the second quadratic equation as zero to establish a third direct equation and a third quadratic equation; and
      calculating the magnetic flux voltage command according to the third direct equation and the third quadratic equation.

2. The motor control method of claim 1, further comprising:
   calculating an active power feedback value based on the synchronous coordinate voltage command and the synchronous coordinate feedback current;
   calculating an air-gap power change based on the active power feedback value and the effective current value; and
   adjusting the synchronous coordinate voltage command and changing the three-phase current based on the air-gap power change.

3. The motor control method of claim 1, further comprising:
   calculating an error value between the excitation current setting value and a direct feedback current of the synchronous coordinate feedback current to generate an excitation error value, wherein the excitation error value is used to be added to the magnetic flux voltage command and the reactive power error value to adjust the synchronous coordinate voltage command.

4. The motor control method of claim 1, wherein the steady state calculation program comprises:
   establishing a direct steady state equation and a quadratic steady state equation according to the frequency command and the effective current value to calculate a steady state value of a direct current and a steady state value of a quadratic current;
   adjusting a difference between the steady state value of the direct current and the steady state value of the quadratic current to fall within an error; and
   substituting the steady state value of the direct current and the steady state value of the quadratic current into the direct steady state equation and the quadratic steady state equation when the difference falls within the error to calculate the reactive power command.

5. A motor control method for a motor without a sensor comprising:
   receiving a frequency command and an excitation current setting value as a motor speed command;
   running a magnetic flux calculation program to generate a magnetic flux voltage command according to the motor speed command;
   converting the magnetic flux voltage command into a synchronous coordinate voltage command, and generating a three-phase current to the motor without the sensor;
   calculating a synchronous coordinate feedback current based on the three-phase current, and calculating an effective current value of the three-phase current;
   calculating an active power feedback value based on the synchronous coordinate voltage command and the synchronous coordinate feedback current;
   calculating an air-gap power change based on the active power feedback value and the effective current value; and
   adjusting the synchronous coordinate voltage command and changing the three-phase current to the motor without the sensor based on the air-gap power change,
   wherein the magnetic flux calculation program comprises:

establishing a first direct equation and a first quadratic equation according to the motor speed command;

respectively eliminating differential term parameters of the first direct equation and the first quadratic equation to establish a second direct equation and a second quadratic equation;

respectively setting quadratic parameters of the second direct equation and the second quadratic equation as zero to establish a third direct equation and a third quadratic equation; and calculating the magnetic flux voltage command according to the third direct equation and the third quadratic equation.

6. The motor control method of claim 5, further comprising:

calculating a reactive power feedback value based on the synchronous coordinate voltage command and the synchronous coordinate feedback current;

running a steady state calculation program to calculate a reactive power command based on the frequency command and the effective current value;

calculating a reactive power error value between the reactive power command and the reactive power feedback value;

calculating an error value between the excitation current setting value and a direct feedback current of the synchronous coordinate feedback current to obtain an excitation error value; and adding the magnetic flux voltage command, the excitation error value, and the reactive power error value to adjust the synchronous coordinate voltage command and change the three-phase current to the motor without the sensor.

7. The motor control method of claim 6, wherein the steady state calculation program comprises:

establishing a direct steady state equation and a quadratic steady state equation according to the frequency command and the effective current value to calculate a steady state value of a direct current and a steady state value of a quadratic current;

adjusting a difference between the steady state value of the direct current and the steady state value of the quadratic current to fall within an error; and substituting the steady state value of the direct current and the steady state value of the quadratic current into the direct steady state equation and the quadratic steady state equation when it is determined that the difference falls within the error to calculate the reactive power command.

8. A motor control device for a motor without a sensor comprising:

a magnetic flux arithmetic unit configured to receive a frequency command and an excitation current setting value to calculate a magnetic flux voltage command;

a drive arithmetic unit configured to convert the magnetic flux voltage command into a synchronous coordinate voltage command, and generate a three-phase current to the motor;

a feedback arithmetic unit configured to calculate a synchronous coordinate feedback current based on the three-phase current, and obtain an effective current value of the three-phase current, wherein the feedback arithmetic unit calculates a reactive power feedback value based on the synchronous coordinate voltage command and the synchronous coordinate feedback current; and a compensation arithmetic unit configured to calculate a reactive power command based on the frequency command and the effective current value;

wherein the compensation arithmetic unit is configured to calculate a reactive power error value between the reactive power command and the reactive power feedback value;

wherein the drive arithmetic unit is further configured to add the magnetic flux voltage command and the reactive power error value to adjust the synchronous coordinate voltage command and change the three-phase current, wherein the magnetic flux arithmetic unit is further configured to:

establish a first direct equation and a first quadratic equation according to the frequency command and the excitation current setting value;

respectively eliminate differential term parameters of the first direct equation and the first quadratic equation to establish a second direct equation and a second quadratic equation;

respectively set quadratic parameters of the second direct equation and the second quadratic equation as zero to establish a third direct equation and a third quadratic equation; and calculate the magnetic flux voltage command according to the third direct equation and the third quadratic equation.

9. The motor control device of claim 8, wherein the compensation arithmetic unit is further configured to calculate an error value between the excitation current setting value and a direct feedback current of the synchronous coordinate feedback current to obtain an excitation error value, so that the excitation error value is added to the magnetic flux voltage command and the reactive power error value to adjust the synchronous coordinate voltage command.

10. The motor control device of claim 8, wherein the feedback arithmetic unit is further configured to calculate an active power feedback value based on the synchronous coordinate voltage command and the synchronous coordinate feedback current.

11. The motor control device of claim 10, further comprising:

a stability arithmetic unit configured to calculate an air-gap power change based on the active power feedback value and the effective current value, wherein the drive arithmetic unit further adjusts the synchronous coordinate voltage command and change the three-phase current based on the air-gap power change.

12. The motor control device of claim 8, wherein the compensation arithmetic unit is further configured to:

establish a direct steady state equation and a quadratic steady state equation according to the frequency command and the effective current value to calculate a steady state value of a direct current and a steady state value of a quadratic current;

adjust a difference between the steady state value of the direct current and the steady state value of the quadratic current to fall within an error; and substitute the steady state value of the direct current and the steady state value of the quadratic current into the direct steady state equation and the quadratic steady state equation when it is determined that the difference falls within the error to calculate the reactive power command.

* * * * *